(12) United States Patent
Zewail et al.

(10) Patent No.: US 11,678,379 B2
(45) Date of Patent: Jun. 13, 2023

(54) PHYSICAL RANDOM ACCESS CHANNEL (PRACH) TRANSMISSION IN NEW RADIO (NR)

(71) Applicant: QUALCOMM Incorporated, San Diego, CA (US)

(72) Inventors: Ahmed Abdelaziz Ibrahim Abdelaziz Zewail, San Diego, CA (US); Xiaoxia Zhang, San Diego, CA (US); Jing Sun, San Diego, CA (US); Srinivas Yerramalli, Hyderabad (IN); Zhifei Fan, San Diego, CA (US); Wooseok Nam, San Diego, CA (US); Tao Luo, San Diego, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 167 days.

(21) Appl. No.: 17/249,167

(22) Filed: Feb. 22, 2021

(65) Prior Publication Data
US 2021/0266979 A1     Aug. 26, 2021

Related U.S. Application Data

(60) Provisional application No. 62/981,405, filed on Feb. 25, 2020.

(51) Int. Cl.
*H04L 27/26* (2006.01)
*H04L 5/00* (2006.01)
*H04W 74/08* (2009.01)

(52) U.S. Cl.
CPC ....... *H04W 74/0833* (2013.01); *H04L 5/0053* (2013.01); *H04L 27/2607* (2013.01)

(58) Field of Classification Search
CPC . H04L 1/08; H04L 27/26025; H04L 27/2607; H04L 27/26132; H04L 5/0007; H04L 5/0053; H04L 5/001; H04L 5/0016; H04L 5/0048; H04W 74/0833
See application file for complete search history.

(56) References Cited

U.S. PATENT DOCUMENTS

| | | | |
|---|---|---|---|
| 2015/0237591 A1* | 8/2015 | Shukair | H04W 56/0045 370/329 |
| 2019/0387546 A1* | 12/2019 | Li | H04L 27/26025 |

FOREIGN PATENT DOCUMENTS

| | | |
|---|---|---|
| EP | 3573381 A1 | 11/2019 |
| WO | 2017014715 A1 | 1/2017 |

OTHER PUBLICATIONS

International Search Report and Written Opinion—PCT/US2021/019173—ISA/EPO—dated Jun. 18, 2021.

(Continued)

*Primary Examiner* — Melvin C Marcelo
*Assistant Examiner* — Natali Pascual Peguero
(74) *Attorney, Agent, or Firm* — Haynes & Boone, LLP

(57) ABSTRACT

Wireless communications systems and methods related to random access signaling are provided. A user equipment (UE) may transmit to a base station (BS) in a frequency band, a random access signal including at least one of a length in time or a length in frequency that is based on a subcarrier spacing (SCS) in the frequency band. The BS may receive the random access signal and transmit a response to the random access signal.

30 Claims, 10 Drawing Sheets

(56) References Cited

OTHER PUBLICATIONS

Samsung: "Initial Access Signals and Channels for NR-U", 3GPP Draft, R1-1910456, 3GPP TSG RAN WG1 #98bis, NR-U IA Signals And Channels, 3rd Generation Partnership Project (3GPP), Mobile Competence Centre, 650, Route Des Lucioles, F-06921 Sophia-Antipolis Cedex, France, vol. RAN WG1, No. Chongqing, China, Oct. 14, 2019-Oct. 20, 2019, Oct. 7, 2019 (Oct. 7, 2019), XP051808927, 12 Pages, Retrieved from the Internet: URL:https://ftp.3gpp.org/tsg_ran/WG1_RL1/TSGR1_98b/Docs/R1-1910456.zip R1-1910456 NR-U IA signals and channels.docx [retrieved on Oct. 7, 2019] p. 7, last line—p. 8; figure 5.

\* cited by examiner

| Preamble Format | # of Sequence Repetitions | Total Sequence Length (μs) | CP Time Total (μs) | GT Time (μs) | # OFDM Symbols |
|---|---|---|---|---|---|
| A1 | 2 | 133.33 | 9.375 | 0 | 2 |
| A2 | 4 | 266.67 | 18.75 | 0 | 4 |
| A3 | 6 | 400 | 28.125 | 0 | 6 |
| B1 | 2 | 133.33 | 7.031 | 2.344 | 2 |
| B2 (last of A2/B2) | 4 | 266.67 | 11.719 | 7.031 | 4 |
| B3 (last of A3/B3) | 6 | 400 | 16.406 | 11.719 | 6 |
| B4 | 12 | 800 | 30.469 | 25.781 | 12 |
| C0 | 1 | 66.67 | 40.36 | 35.677 | 2 |
| C2 | 4 | 266.67 | 66.67 | 94.922 | 6 |

SCS=15 kHz,
L(Sequence length)=139,
N (Minimum number of tones PRACH preamble will occupy)=144,
Bandwidth=2.16 MHz,
One sequence length=66.67 microseconds (μs)

410

| Preamble Format | SCS (kHz) | Bandwidth (MHz) | # of Sequence Repetitions | Total Sequence Length (μs) | CP Time (ms) | GT Time (ms) |
|---|---|---|---|---|---|---|
| 0 | 1.25 | 1.08 | 1 | 0.8 | 0.103 | 0.097 |
| 1 | 1.25 | 1.08 | 2 | 0.8 | 0.684 | 0.713 |
| 2 | 1.25 | 1.08 | 4 | 0.8 | 0.153 | 0.147 |
| 3 | 5 | 4.32 | 4 | 0.2 | 0.103 | 0.097 |

L(Sequence length)=839,
N (Minimum number of tones PRACH preamble will occupy)=864

FIG. 4

FIG. 5

PHYSICAL RANDOM ACCESS CHANNEL (PRACH) TRANSMISSION IN NEW RADIO (NR)

CROSS REFERENCE TO RELATED APPLICATIONS & PRIORITY CLAIM

The present application claims priority to and the benefit of U.S. Provisional Patent Application No. 62/981,405 filed Feb. 25, 2020, which is hereby incorporated by reference in its entirety as if fully set forth below and for all applicable purposes.

TECHNICAL FIELD

This application relates to wireless communication systems, and more particularly to improving performance and communication device efficiency in wireless networks operating at high millimeter wave (mmWave) bands by communicating one or more repetitions of a preamble format signal in time and/or in frequency based on a subcarrier spacing (SCS).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

A UE may transmit a random access preamble signal to the BS to initiate network access. If the UE transmits the random access preamble signal using a large subcarrier spacing (SCS), a time duration of the symbols of the random access preamble signal may be smaller compared to when the UE transmits the random access preamble signal using a smaller SCS. Such transmission may result in reduced signal coverage. Conversely, if the UE transmits the random access preamble signal using a smaller SCS, the UE may be unable to transmit at a full transmit power due to power limits (e.g., power spectral density (PSD) limits).

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

In an aspect of the disclosure, a method of wireless communication includes communicating, by a first wireless communication device with a second wireless communication device, a random access signal in a frequency band, the random access signal including at least one of a length in time or a length in frequency that is based on a subcarrier spacing (SCS) in the frequency band; and communicating, by a first wireless communication device with a second wireless communication device, a random access response in response to the random access signal.

In an additional aspect of the disclosure, an apparatus includes a transceiver configured to: communicate, by a first wireless communication device with a second wireless communication device, a random access signal in a frequency band, wherein the random access signal includes at least one of a length in time or a length in frequency that is based on a SCS in the frequency band; and communicate, by a first wireless communication device with a second wireless communication device, a random access response in response to the random access signal.

In an additional aspect of the disclosure, a computer-readable medium having program code recorded thereon, the program code including code for causing a first wireless communication device to communicate with a second wireless communication device, a random access signal in a frequency band, wherein the random access signal includes at least one of a length in time or a length in frequency that is based on a SCS in the frequency band; and code for causing the first wireless communication device to communicate with a second wireless communication device, a random access response in response to the random access signal.

In an additional aspect of the disclosure, an apparatus includes means for communicating with a second wireless communication device, a random access signal in a frequency band, the random access signal including at least one of a length in time or a length in frequency that is based on a SCS in the frequency band; and means for communicating with a second wireless communication device, a random access response in response to the random access signal.

Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 4 illustrates various long PRACH format configurations according to one or more aspects of the present disclosure.

FIG. 5 illustrates PRACH format configurations according to one or more aspects of the present disclosure.

DETAILED DESCRIPTION

Figure 1:
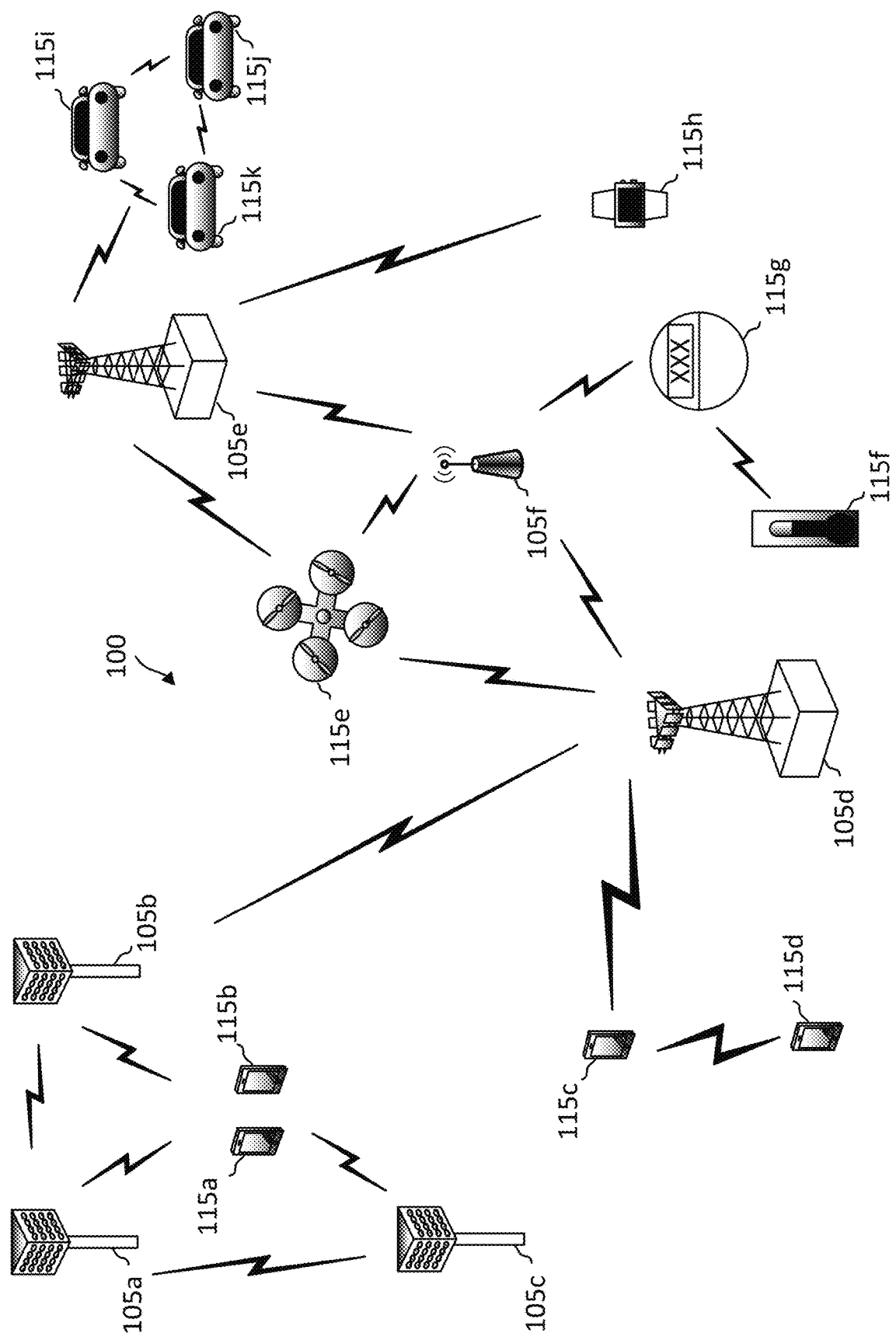
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, 5th Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

A 5G NR communication system may be implemented to use optimized OFDM-based waveforms with scalable numerology and transmission time interval (TTI). Additional features may also include having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

The present application describes mechanisms for communicating random access preamble signals in a frequency spectrum. The frequency spectrum may be a shared spectrum or an unlicensed spectrum. Channel bandwidths at high frequency bands (e.g., mmWave bands) may be wide or large. One approach to maintaining a certain implementation or processing complexity (e.g., fast Fourier transform (FFT) processing, baseband processing) at wireless communication devices is to utilize a large subcarrier spacing (SCS). For instance, at frequency bands higher than about 52.6 gigahertz, a SCS of about 960 kHz may be used to limit an FFT size to be about 4K or less, while supporting a larger BW (e.g., 2 GHz). At high mmWave bands, when the UE transmits a random access preamble signal using a large SCS, a time duration of the symbols of the random access preamble signal may be smaller compared to when the UE transmits the random access preamble signal using a smaller SCS. The SCS and the symbol duration of the random access preamble signal are inversely related. A shorter symbol time duration may result in a reduction in physical random access channel (PRACH) coverage.

In some aspects, the UE may transmit a random access preamble signal in a frequency band to a BS, where the random access preamble signal is based on a subcarrier spacing (SCS) in the frequency band. In some examples, to compensate for the reduction in PRACH coverage due to the shorter symbol duration with the larger SCS, the UE may transmit a random access preamble signal including a length in time, where the random access preamble signal may include multiple repetitions of a PRACH format signal during the length in time. The repetition of the PRACH format signals in time may compensate for the shorter symbol duration. In some examples, a large SCS may refer to a SCS that is at least 120 kHz (e.g., 120 kHz, 240 kHz, 480 kHz, 960 kHz, etc.), and a small SCS may refer to a SCS that is below 120 kHz (e.g., 15 kHz, 30 kHz, 60 kHz, etc.)

Another approach to maintaining a certain implementation or processing complexity (e.g., baseband processing) at wireless communication devices is to maintain the usage of a small SCS. If the UE transmits a random access preamble signal using a small SCS, the bandwidth for the transmission may be limited and accordingly the transmit power may also be limited. For example, if the UE is transmitting in a narrow bandwidth, it may be undesirable for the UE to increase the transmit power because the average power may exceed a limit (e.g., a power spectral density (PSD) limit). To transmit at the UE's full power transmission (e.g., 23 decibel milliwatts (dBm)) under such conditions, the UE may increase the bandwidth of the signal transmission. To do so, the random access preamble signal may include multiple repetitions of a PRACH format signal spanning a length in frequency. In some examples, to transmit at the UE's full power transmit due to the smaller PRACH SCS, the UE may transmit a random access preamble signal including a length in frequency, where the random access preamble signal may include multiple repetitions of a PRACH format signal during the length in frequency. It should be understood that a single long sequence, a single instance, and/or no repetition may be used for the time length and/or for the frequency length.

FIG. 1 illustrates a wireless communication network 100 according to some aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115i, 115j, or 115k and other UEs 115, and/or vehicle-to-infrastructure (V2I) communications between a UE 115i, 115j, or 115k and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes an UL subframe in an UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate an UL channel Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. An UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining minimum system information (RMSI), and other system information (OSI)) to facilitate initial network access. In some instances, the BSs 105 may broadcast the PSS, the SSS, and/or the MIB in the form of synchronization signal blocks (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI, OSI, and/or one or more system information blocks (SIB s). The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, SRS, and cell barring. In some aspects, SIB1 may indicate a PRACH format signal for transmitting a random access signal.

After obtaining the MIB, the RMSI and/or the OSI, the UE 115 can perform a random access procedure to establish a connection with the BS 105. For the random access procedure, the UE 115 may transmit a random access preamble and the BS 105 may respond with a random access response. Upon receiving the random access response, the UE 115 may transmit a connection request to the BS 105 and the BS 105 may respond with a connection response (e.g., contention resolution message).

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit an UL communication signal to the BS 105 via a PUSCH and/or PUCCH according to an UL scheduling grant.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. The UE 115 may monitor the active BWP for signaling information from the BS 105. The BS 105 may schedule the UE 115 for UL or DL communications in the active BWP. In some embodiments, a BS 105 may assign a pair of BWPs within the CC to a UE 115 for UL and DL communications. For example, the BWP pair may include one BWP for UL communications and one BWP for DL communications.

In an embodiment, the network 100 may operate over a shared channel, which may include shared frequency bands or unlicensed frequency bands. For example, the network 100 may be an NR-U network. To facilitate network access, the BS 105 may broadcast a PRACH configuration indicating random access opportunities. The configuration may include time location, frequency location, PRACH preamble formats (e.g., cyclic prefix (CP) lengths, preamble sequence root and/or cyclic-shift parameters, number of sequence repetitions, and/or gap durations), and any information related to random access preamble generation and/or transmission. A UE 115 desiring to connect to the BS 105 may initiate a random access procedure by selecting one of the configured random access opportunities and transmitting a random access preamble signal to the BS 105. Mechanisms for transmitting and receiving random access preamble signals are described in greater detail herein.

Figures 2, 3:
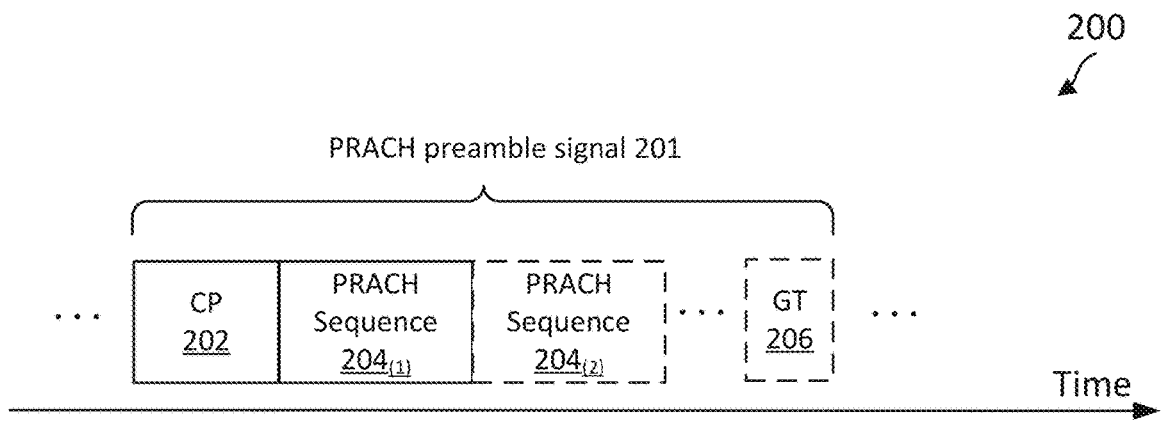
FIG. 2 illustrates a physical random access channel (PRACH) preamble signal configuration according to one or more aspects of the present disclosure.
FIG. 3 illustrates various short PRACH format configurations according to one or more aspects of the present disclosure.

FIG. 2 illustrates a PRACH preamble signal configuration 200 according to one or more aspects of the present disclosure. The PRACH preamble configuration 200 may be employed by a BS such as the BS 105 and a UE such as the UE 115 in a network such as the network 100. In FIG. 2, the x-axis represents time in some constant units.

A PRACH preamble signal 201 may be in accordance with the PRACH preamble configuration 200. A UE 115 may transmit the PRACH preamble signal 201 to the BS 105 over PRACH channel to obtain network access and/or UL synchronization with the network. The PRACH preamble signal 201 may include a cyclic prefix (CP) 202, followed by one or more instances or repetitions of a PRACH sequence 204. For example, a PRACH sequence $204_{(2)}$ may be an instance or repetition of the PRACH sequence $204_{(1)}$. Accordingly, the PRACH sequences $204_{(1)}, 204_{(2)}$ may be the same, but transmitted at different times. A symbol may include the CP and a useful portion. The useful portion may be or include a waveform sequence, data, and/or reference signal information. In some examples, the sequence 204 may be a Zadoff-Chu (ZC) sequence, a gold sequence, an m-sequence or any suitable orthogonal sequence and may include cyclic shifts and/or root sequences. The PRACH sequence 204 may be, for example, a ZC sequence generated based on a sequence root and a cyclic-shift. Some preamble signals may include a guard time (GT) 206 (e.g., guard interval or a gap interval) at the end of the PRACH preamble signal 201. The GT 206 may be defined within the last RACH preamble along consecutively transmitted RACH preambles.

The BS 105 may configure various PRACH preamble formats, such as a short preamble format and a long preamble format. Differences in the time domain of different preamble formats may include different CP lengths, sequence lengths, GT lengths, and/or number of repetitions. In general, the number of OFDM symbols, the number of sequence repetitions, the total sequence length, the time duration of the CP, the time duration of the GT, and/or the number of OFDM symbols for a PRACH preamble format can vary depending on the deployment of the network. Structures of PRACH preamble signals and mechanisms for configuring PRACH preamble signals are described in greater detail herein.

The BS 105 may configure various PRACH preamble formats, for example, as shown in FIGS. 3 and 4. FIG. 3 illustrates various short PRACH format configurations 300 according to one or more aspects of the present disclosure. The configurations 300 may be employed by a BS such as the BS 105 and a UE such as the UE 115 in a network such as the network 100. In particular, a BS 105 may employ the configuration 300 to configure PRACH preamble formats to facilitate network access, and a UE 115 may transmit a PRACH preamble signal in accordance with the configuration 300 to initiate network access with the BS 105.

In the example illustrated in FIG. 3, the BS 105 may configure various short PRACH preamble formats, for example, as shown in a table 310. As discussed in the present disclosure, short PRACH preambles format signals may be used in mmWave transmissions. The table 310 includes a PRACH preamble format A1, a PRACH preamble format A2, a PRACH preamble format A3, a PRACH preamble format B1, a PRACH preamble format B2, a PRACH preamble format B3, a PRACH preamble format B4, a PRACH preamble format C0, and a PRACH preamble format C2, which may be similar to the PRACH preamble formats in 3GPP Release 15 for 5G NR TDD frequency range (FR) 2. The number of sequence repetitions, the total sequence length, the length or time duration of the CP, the length or time duration of the GT, and the number of OFDM symbols for each PRACH preamble format for 15 kHz numerology (e.g., SCS=15), L (sequence length)=139, N (minimum number of tones PRACH preamble will occupy)=144, bandwidth=2.16 MHz, and a sequence length of 66.67 microseconds are shown in columns 312, 314, 316, 318, and 320, respectively.

Referring to the first entry in the table 310, the PRACH preamble format A1 may span a time duration of about two OFDM symbols, with the CP having a length of about 9.375 microseconds (µs) followed by about two repetitions or instances of a predetermined sequence, without any guard or gap interval. Referring to the fourth entry in the table 310, the PRACH preamble format B1 may span a time duration of about two OFDM symbols, with the CP having a length of about 7.031 µs followed by about two repetitions or instances of a predetermined sequence, with a GT length of about 2.344 µs.

For 30 kHz SCS, 60 kHz SCS, and 120 kHz SCS, the preamble format may be scaled according to the SCS. Additionally, PRACH preambles may be aligned with OFDM symbol boundary for data with the same numerology.

FIG. 4 illustrates various long PRACH format configurations 400 according to one or more aspects of the present disclosure. The configurations 400 may be employed by a BS such as the BS 105 and a UE such as the UE 115 in a network such as the network 100. In particular, a BS 105 may employ the configuration 400 to configure PRACH preamble formats to facilitate network access, and a UE 115 may transmit a PRACH preamble signal in accordance with the configuration 400 to initiate network access with the BS 105.

In the example illustrated in FIG. 4, the BS may configure various long PRACH preamble formats, for example, as shown in a table 410. As discussed in the present disclosure, long PRACH preamble formats may be used in mmWave transmissions. The table 410 includes a PRACH preamble format 0, a PRACH preamble format 1, a PRACH preamble format 2, and a PRACH preamble format 3, which may be similar to the PRACH preamble formats in 3GPP Release 15 for 5G NR TDD frequency range (FR) 1. The SCS, the bandwidth, the number of sequence repetitions, the total sequence length, the length or time duration of the CP, the length or time duration of the GT for each PRACH preamble format for L (sequence length)=839 and N (minimum number of tones PRACH preamble will occupy)=864 are shown in columns 412, 414, 416, 418, 420, and 422, respectively.

Referring to the first entry in the table 410, the PRACH preamble format for 1.25 kHz SCS and a bandwidth of 1.08 MHz may include a CP having a length of about 0.103 ms followed by one repetition or instance of a predetermined sequence, with a GT length of about 0.097 ms. Referring to the fourth entry in the table 410, the PRACH preamble format for 5 kHz SCS and a bandwidth of 4.32 MHz may include a CP having a length of about 0.103 ms followed by about four repetitions or instances of a predetermined sequence, with a GT length of about 0.097 ms.

Figure 5:
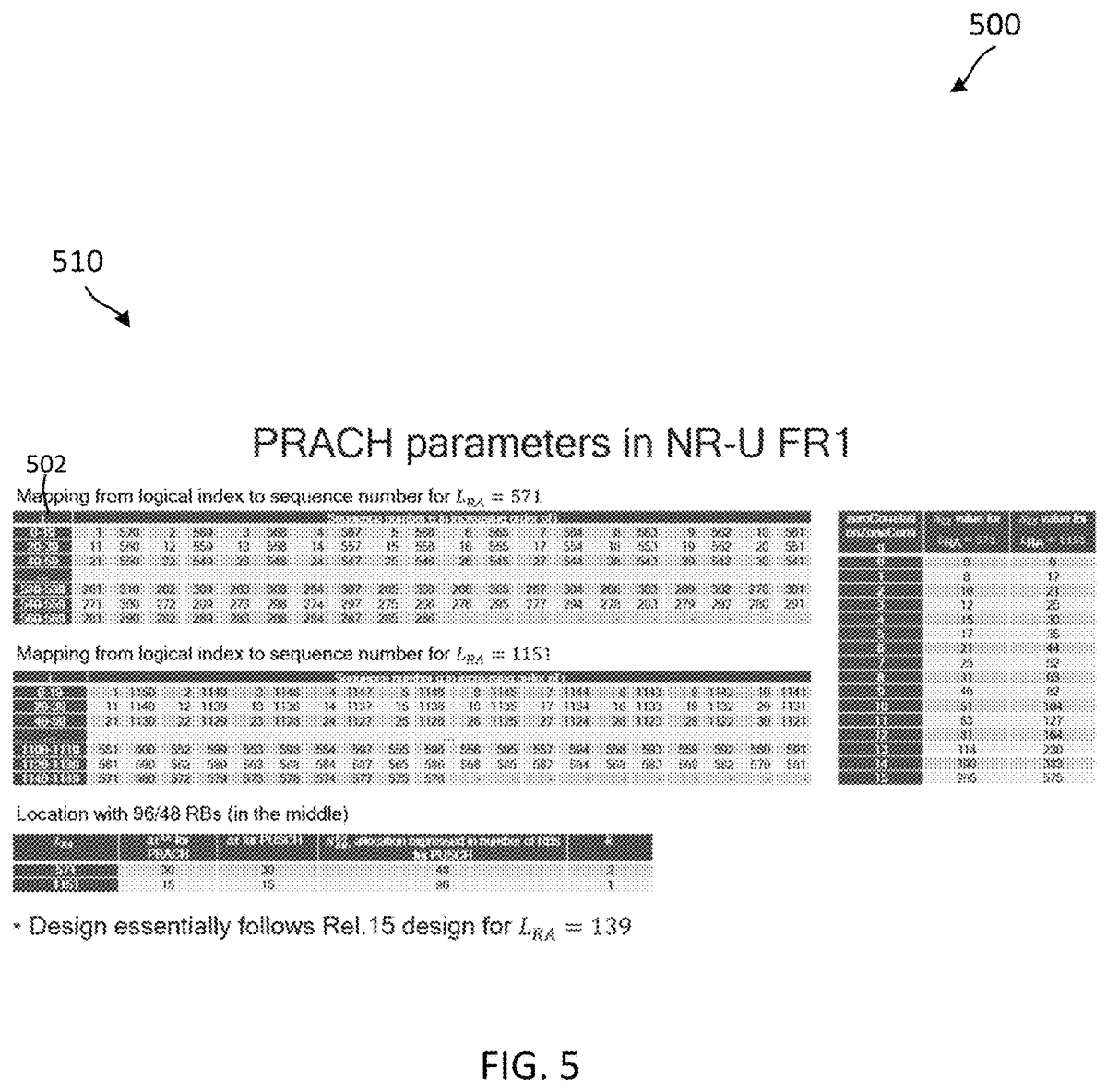

FIG. 5 illustrates PRACH format configurations 500 according to one or more aspects of the present disclosure. The configurations 500 may be employed by a BS such as the BS 105 and a UE such as the UE 115 in a network such as the network 100. In particular, a BS 105 may employ the configuration 500 to configure PRACH preamble formats to facilitate network access, and a UE 115 may transmit a PRACH preamble signal in accordance with the configuration 500 to initiate network access with the BS 105.

The BS 105 may configure the UE to use at least one of the PRACH format configurations 500 illustrated in a table 510. The table 510 includes PRACH sequences and the design of these sequences may follow a similar design or the same design as the short PRACH sequences shown in FIG. 2. The entries in the table 510 may provide a logical mapping to an actual root index to be used for the ZC sequence generated.

To generate a ZC sequence, the UE 115 may substitute a root index and a cyclic shift into a ZC sequence equation. The table 510 includes a column 502 storing a logical root index. The BS 105 may configure the UE 115 with the logical root index, and the UE 115 may look up the logical root index using the column 502 in the table 510 to determine the PRACH sequence length. For example, if the logical root index is 1, the UE 115 may determine that the actual root index is 570. The BS and the UE may support and use the PRACH format A signal, PRACH format B signal, and PRACH format C signal, and the table 510 may support these PRACH format A, B, and C signals with a longer sequence. For example, a single long ZC sequence for 15 kHz SCS may have a sequence length of 1151. In another example, a single long ZC sequence for 30 kHz SCS may have a sequence length of 571. Other than the sequence length, the PRACH design provided in the table 510 may be similar to or the same as the PRACH designs provided in the short sequences provided in 3GPP Release 15 for 5G NR TDD FR 2.

The PRACH format configurations 300, 400, and/or 500 in FIGS. 3, 4, and/or 5, respectively, may be supported in NR. The SCS and the OFDM symbol duration may be included. To facilitate random access in the network, the BS may broadcast PRACH preamble format information, for example, in a SIB signal. In some examples, the BS transmits a SIB1 indicating a configuration for a PRACH format signal for transmitting a random access signal. The indicated PRACH format signal may be, for example, a short PRACH format signal having a sequence length of 139 (see FIG. 2) or a long PRACH sequence having a sequence length of 571 or 1151 (see FIG. 5).

Figure 6:
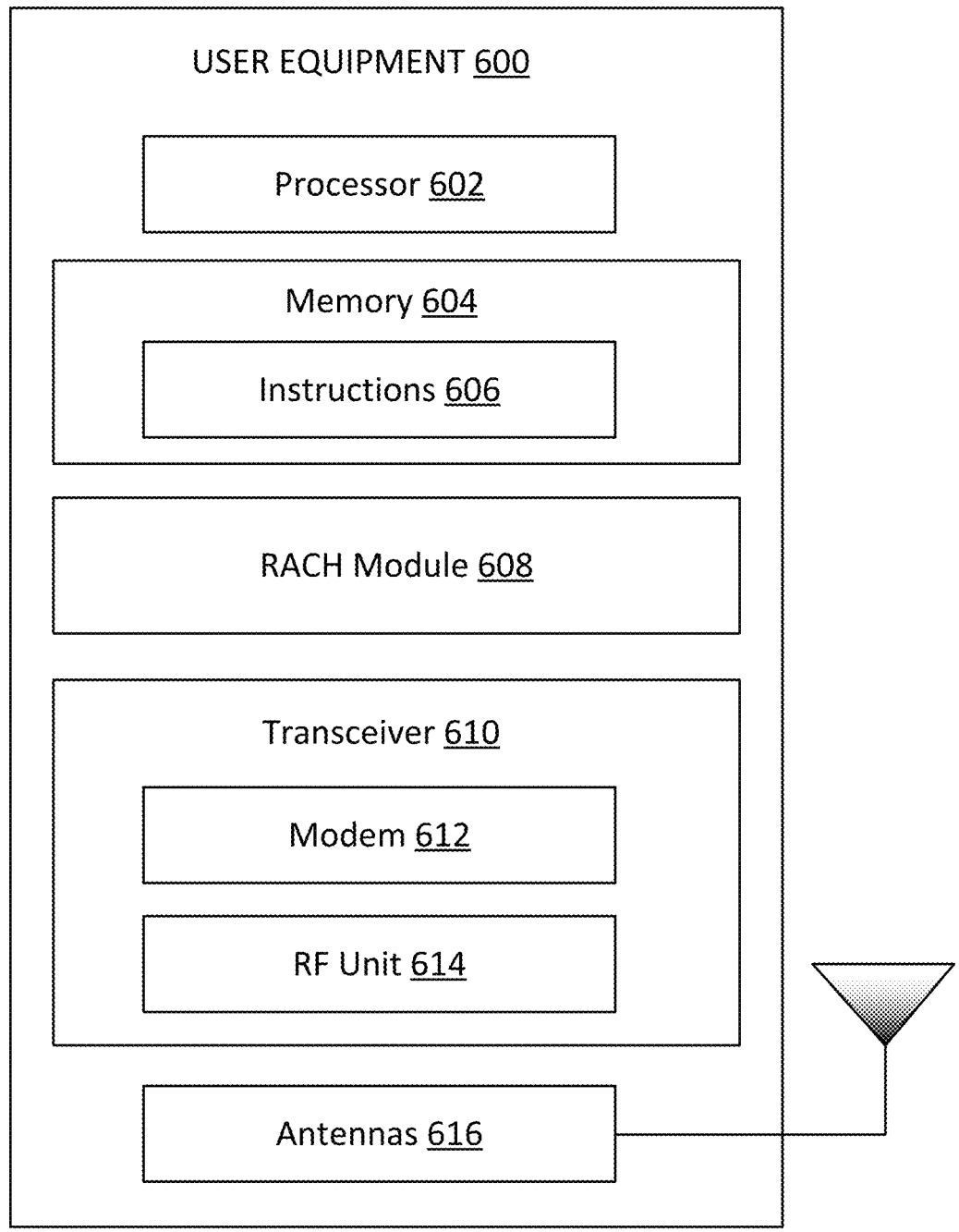
FIG. 6 is a block diagram of an example user equipment (UE) according to one or more aspects of the present disclosure.

FIG. 6 is a block diagram of an example UE 600 according to one or more aspects of the present disclosure. The UE 600 may be a UE 115 as discussed above in FIG. 1. As shown, the UE 600 may include a processor 602, a memory 604, a RACH module 608, a transceiver 610 including a modem subsystem 612 and a radio frequency (RF) unit 614, and one or more antennas 616. These elements may be in direct or indirect communication with each other, for example via one or more buses.

The processor 602 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 602 may also be implemented as a combination of computing devices, e.g., a combination of a DSP and a microprocessor, a plurality of microprocessors, one or more microprocessors in conjunction with a DSP core, or any other such configuration.

The memory 604 may include a cache memory (e.g., a cache memory of the processor 602), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 604 includes a non-transitory computer-readable medium. The memory 604 may store, or have recorded thereon, instructions 606. The instructions 606 may include instructions that, when executed by the processor 602, cause the processor 602 to perform the operations described herein with reference to the UEs (e.g., UE 115 and/or UE 600) in connection with aspects of the present disclosure, for example, aspects of FIGS. 1, 2, 3, 4, 5, 8, 9, 10, 11, 12, and/or 13. Instructions 606 may also be referred to as program code. The program code may be for causing a wireless communication device to perform these operations, for example by causing one or more processors (such as processor 602) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The RACH module 608 may be implemented via hardware, software, or combinations thereof. For example, the RACH module 608 may be implemented as a processor, circuit, and/or instructions 606 stored in the memory 604 and executed by the processor 602. In some instances, the RACH module 608 can be integrated within the modem subsystem 612. For example, the RACH module 608 can be implemented by a combination of software components (e.g., executed by a DSP or a general processor) and hardware components (e.g., logic gates and circuitry) within the modem subsystem 612.

The RACH module 608 may be used for various aspects of the present disclosure, for example, aspects of FIGS. 1, 2, 3, 4, 5, 8, 9, 10, 11, 12, and/or 13. In some aspects, the RACH module 608 may be configured to communicate with a BS, a random access signal in a frequency band, the random access signal including at least one of a length in time or a length in frequency that is based on a SCS in the frequency band. The RACH module 608 may be further configured to communicate with the BS, a random access response in response to the random access signal. For example, the RACH module 608 may transmit to the BS, a PRACH preamble signal in a frequency band, the PRACH preamble signal including at least one of a length in time or a length in frequency that is based on a SCS in the frequency band. The RACH module 608 may receive from the BS, the random access response in response to the PRACH preamble signal.

As shown, the transceiver 610 may include the modem subsystem 612 and the RF unit 614. The transceiver 610 can be configured to communicate bi-directionally with other devices, such as the BSs 105 and/or another core network element. The modem subsystem 612 may be configured to modulate and/or encode the data from the memory 604 and/or the RACH module 608 according to a modulation and coding scheme (MCS), e.g., a low-density parity check (LDPC) coding scheme, a turbo coding scheme, a convolutional coding scheme, a polar coding scheme, a digital beamforming scheme, etc. The RF unit 614 may be configured to process (e.g., perform analog to digital conversion or digital to analog conversion, etc.) modulated/encoded data (e.g., random access signal, a random access response, CP, a PRACH sequence, GT, the SCS, the number of repetitions or instances of a short PRACH format signal, the number of repetitions or instances of a long PRACH format signal, bandwidth, etc.) from the modem subsystem 612 (on outbound transmissions) or of transmissions originating from another source such as a UE 115 or a BS 105. The RF unit 614 may be further configured to perform analog beamforming in conjunction with the digital beamforming. Although shown as integrated together in transceiver 610, the modem subsystem 612 and the RF unit 614 may be separate devices that are coupled together at the UE 115 to enable the UE 115 to communicate with other devices.

The RF unit 614 may provide the modulated and/or processed data, e.g. data packets (or, more generally, data messages that may contain one or more data packets and other information), to the antennas 616 for transmission to one or more other devices. The antennas 616 may further receive data messages transmitted from other devices. The antennas 616 may provide the received data messages for processing and/or demodulation at the transceiver 610. The transceiver 610 may provide the demodulated and decoded data (e.g., a random access signal, a random access response, CP, a PRACH sequence, GT, the SCS, the number of repetitions or instances of a short PRACH format signal, the number of repetitions or instances of a long PRACH format signal, bandwidth, etc.) to the RACH module 608 for processing. The antennas 616 may include multiple antennas of similar or different designs in order to sustain multiple transmission links. The RF unit 614 may configure the antennas 616.

In an aspect, the transceiver 610 may coordinate with the RACH module 608 to transmit the random access signal in the frequency band to the BS and to receive a random access response in response to the random access signal from the BS. In an aspect, the UE 600 can include multiple transceivers 610 implementing different RATs (e.g., NR and LTE). In an aspect, the UE 600 can include a single transceiver 610 implementing multiple RATs (e.g., NR and LTE). In an aspect, the transceiver 610 can include various components, where different combinations of components can implement different RATs.

Figure 7:
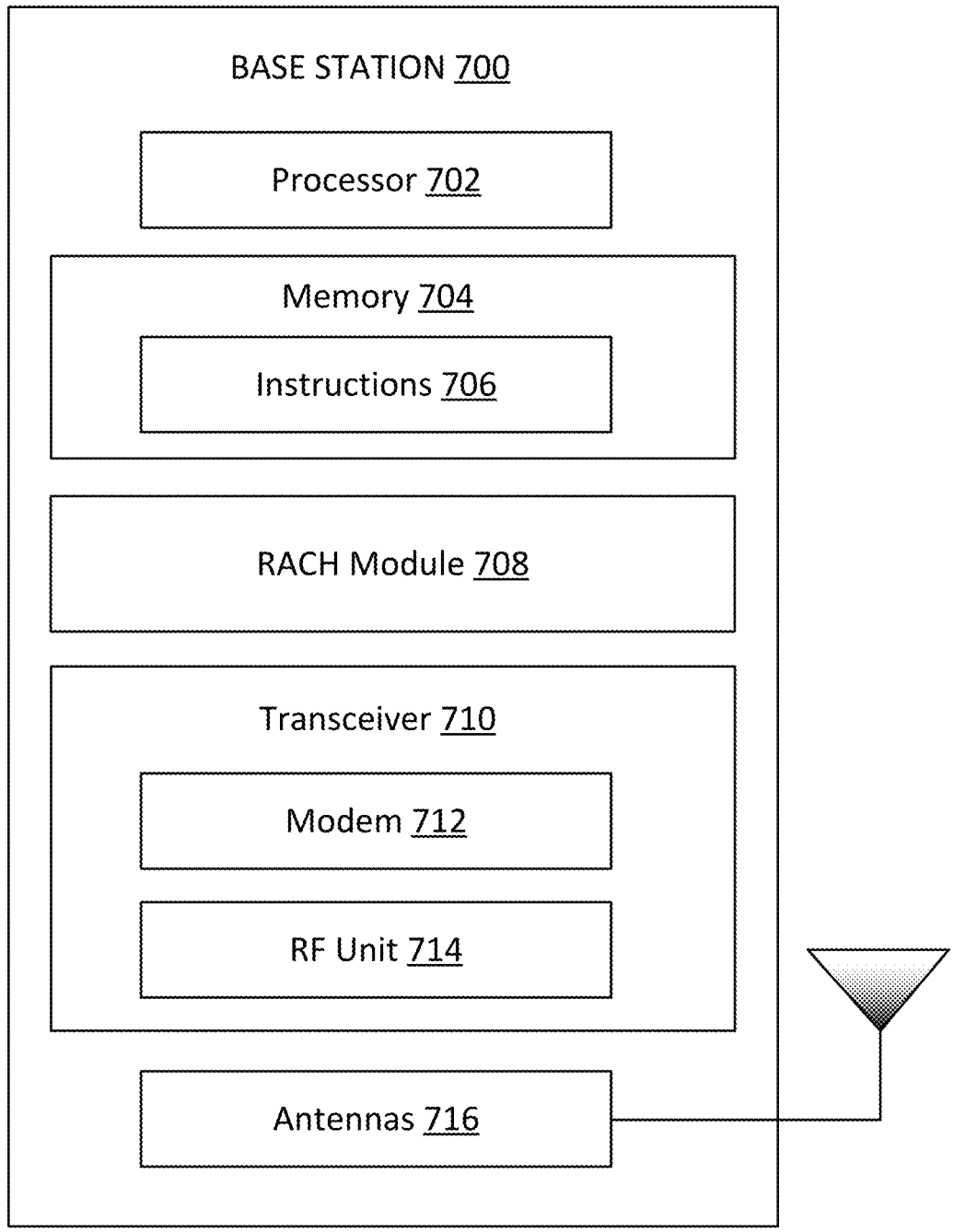
FIG. 7 is a block diagram of an example base station (BS) according to one or more aspects of the present disclosure.

FIG. 7 is a block diagram of an example BS 700 according to one or more aspects of the present disclosure. The BS 700 may be a BS 105 as discussed above in FIG. 1. As shown, the BS 700 may include a processor 702, a memory 704, a RACH module 708, a transceiver 710 including a modem subsystem 712 and a RF unit 714, and one or more antennas 716. These elements may be in direct or indirect communication with each other, for example via one or more buses.

The processor 702 may have various features as a specific-type processor. For example, these may include a CPU, a DSP, an ASIC, a controller, a FPGA device, another hardware device, a firmware device, or any combination thereof configured to perform the operations described herein. The processor 702 may also be implemented as a combination of computing devices, e.g., a combination of a DSP and a microprocessor, a plurality of microprocessors, one or more microprocessors in conjunction with a DSP core, or any other such configuration.

The memory 704 may include a cache memory (e.g., a cache memory of the processor 702), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 704 may include a non-transitory computer-readable medium. The memory 704 may store instructions 706. The instructions 706 may include instructions that, when executed by the processor 702, cause the processor 702 to perform operations described herein with reference to the BSs (e.g., BS 105 and/or BS 700) in connection with aspects of the present disclosure, for example, aspects of FIGS. 1, 2, 3, 4, 5, 8, 9, 10, 11, 12, and/or 13. Instructions 706 may also be referred to as code, which may be interpreted broadly to include any type of computer-readable statement(s) as discussed above with respect to FIG. 6.

The RACH module 708 may be implemented via hardware, software, or combinations thereof. For example, the RACH module 708 may be implemented as a processor, circuit, and/or instructions 706 stored in the memory 704 and executed by the processor 702. In some instances, the RACH module 708 can be integrated within the modem subsystem 712. For example, the RACH module 708 can be implemented by a combination of software components (e.g., executed by a DSP or a general processor) and hardware components (e.g., logic gates and circuitry) within the modem subsystem 712.

The RACH module 708 may be used for various aspects of the present disclosure, for example, aspects of FIGS. 1, 2, 3, 4, 5, 8, 9, 10, 11, 12, and/or 13. In some aspects, the RACH module 708 may be configured to communicate with a UE, a random access signal in a frequency band, the random access signal including at least one of a length in time or a length in frequency that is based on a SCS in the frequency band. The RACH module 708 may be further configured to communicate with the UE, a random access response in response to the random access signal. For example, the RACH module 708 may receive from the UE, a PRACH preamble signal in a frequency band, the PRACH preamble signal including at least one of a length in time or a length in frequency that is based on a SCS in the frequency band. The RACH module 708 may receive from the UE, a random access response in response to the PRACH preamble signal.

As shown, the transceiver 710 may include the modem subsystem 712 and the RF unit 714. The transceiver 710 can be configured to communicate bi-directionally with other devices, such as the UE 115 and/or another core network element. The modem subsystem 712 may be configured to modulate and/or encode data according to a MCS, e.g., a LDPC coding scheme, a turbo coding scheme, a convolutional coding scheme, a polar coding scheme, a digital beamforming scheme, etc. The RF unit 714 may be configured to process (e.g., perform analog to digital conversion or digital to analog conversion, etc.) modulated/encoded data (e.g., a random access signal, a random access response, CP, a PRACH sequence, GT, the SCS, the number of repetitions or instances of a short PRACH format signal, the number of repetitions or instances of a long PRACH format signal, bandwidth, etc.) from the modem subsystem 712 (on outbound transmissions) or of transmissions originating from another source such as a UE 115 or a BS 105. The RF unit 714 may be further configured to perform analog beamforming in conjunction with the digital beamforming. Although shown as integrated together in transceiver 710, the modem subsystem 712 and/or the RF unit 714 may be separate devices that are coupled together at the BS 105 to enable the BS 105 to communicate with other devices.

The RF unit 714 may provide the modulated and/or processed data, e.g. data packets (or, more generally, data messages that may contain one or more data packets and other information), to the antennas 716 for transmission to one or more other devices. This may include, for example, transmission of information to complete attachment to a network and communication with a camped UE 115 or 600 according to some aspects of the present disclosure. The antennas 716 may further receive data messages transmitted from other devices and provide the received data messages for processing and/or demodulation at the transceiver 710. The transceiver 710 may provide the demodulated and decoded data (e.g., a random access signal, a random access response, CP, a PRACH sequence, GT, the SCS, the number of repetitions or instances of a short PRACH format signal, the number of repetitions or instances of a long PRACH format signal, bandwidth, etc.) to the RACH module 708 for processing. The antennas 716 may include multiple antennas of similar or different designs in order to sustain multiple transmission links.

In an aspect, the transceiver 710 may coordinate with the RACH module 708 to receive the random access signal in the frequency band from the UE and to transmit a random access response in response to the random access signal to the UE. In an aspect, the BS 700 can include multiple transceivers 710 implementing different RATs (e.g., NR and LTE). In an aspect, the BS 700 can include a single transceiver 710 implementing multiple RATs (e.g., NR and LTE). In an aspect, the transceiver 710 can include various components, where different combinations of components can implement different RATs.

The present disclosure provides mechanisms for PRACH design in mmWave. For example, if a UE 115 transmits a random access signal in a high-frequency band (e.g., greater than 52.6 GHz) such as a mmWave band, a larger SCS (e.g., at least 120 kHz) may result in a shorter time duration of a symbol. The SCS and the symbol duration of the random access preamble signal are inversely related. With a larger SCS, the PRACH coverage is reduced. For example, if the UE uses a SCS of 120 kHz and a SCS of 960 kHz for transmission of the random access preamble signal, up to a ten decibel (dB) difference in PRACH coverage may be expected.

It may be beneficial to consider PRACH with the matching numerology as data to facilitate processing by the BS 105. For example, to compensate for the coverage due to a shorter symbol duration with a larger PRACH SCS, the UE 115 may transmit a single PRACH format signal including multiple repetitions of a short PRACH format signal in time. The UE 115 may repeat each short PRACH format signal in time to compensate for the loss in the coverage. In some examples, the UE 115 may aggregate the multiple repetitions of the short PRACH format signal (e.g., as shown in FIG. 2 for the 15 kHz numerology) with scaled numerology into a single PRACH format signal that is longer than the initial short PRACH format signal. The use of repetitions of a short PRACH format signal can allow reuse of current PRACH formats and provide a sufficient signal coverage and/or random access performance. In some examples, the UE 115 may transmit the multiple repetitions of the short PRACH format signal with scaled numerology based on a spreading code.

Figure 8:
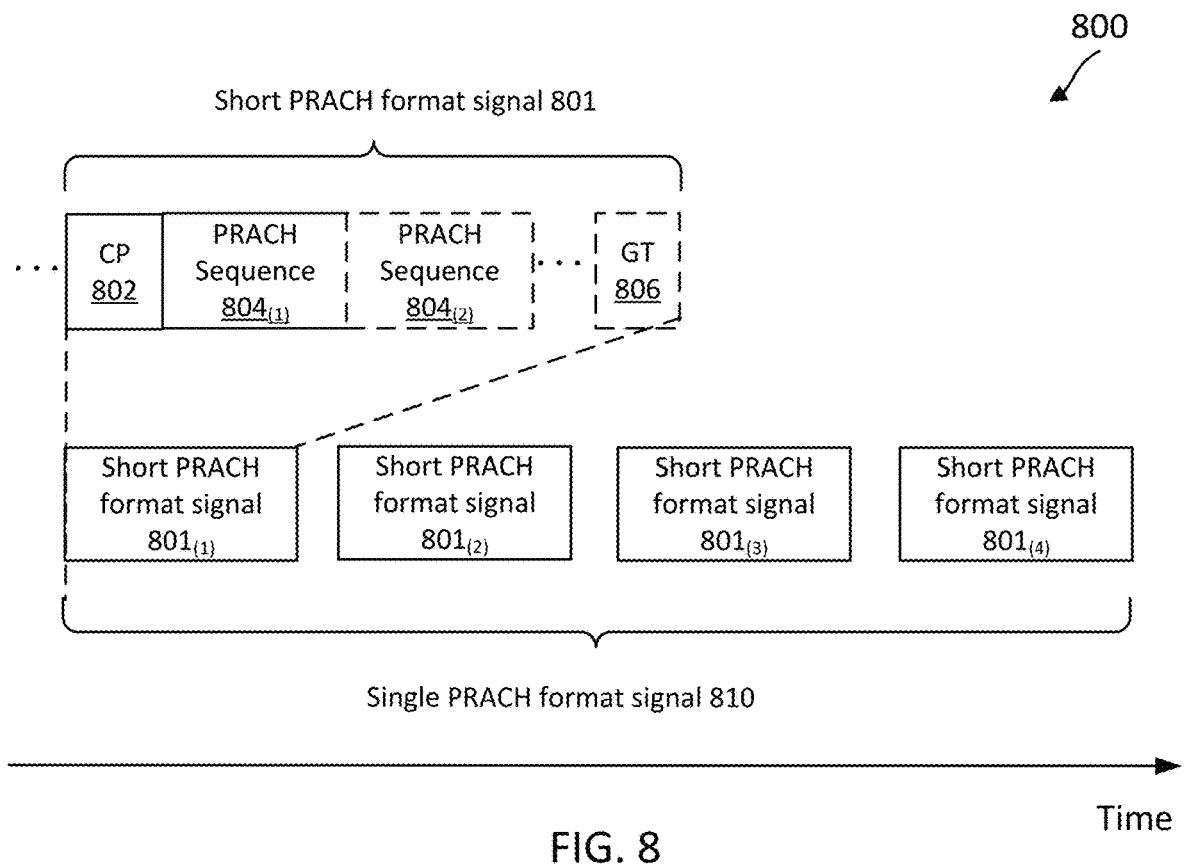
FIG. 8 illustrates a random access signal configuration including multiple repetitions of a PRACH sequence in time according to one or more aspects of the present disclosure.

FIG. 8 illustrates a random access signal configuration 800 including multiple repetitions of a PRACH sequence in time according to one or more aspects of the present disclosure. The configuration 800 may be employed by a BS such as the BS 105 and a UE such as the UE 115 in a network such as the network 100. In particular, a BS 105 may employ the configuration 800 to configure a PRACH format signal to facilitate network access. In FIG. 8, the x-axis represents time in some constant units.

In the example illustrated in FIG. 8, the UE 115 may transmit a single PRACH format signal 810 including multiple repetitions of a short PRACH format signal 801 with scaled numerology. The short PRACH format signal 801 may correspond to the PRACH preamble signal in FIG. 2 and/or to the PRACH formats shown in the table 310 of FIG. 3. The short PRACH format signal 801 includes a CP 802 followed by one or more PRACH sequences 804, with or without a GT 806. Referring back to FIG. 3, if the short PRACH format signal 801 is a PRACH format A signal, the short PRACH format signal 801 would not have the GT 806. In this scenario, each repetition of the multiple repetitions may include a CP 802 and one or more PRACH sequences 804 (without the GT 806). If the short PRACH format signal 801 is a PRACH format B signal or a PRACH format C signal, the short PRACH format signal 801 would have the GT 806. In this scenario, each repetition of the multiple repetitions may include a CP 802, one or more PRACH sequences 804, and a GT 806. In some examples, the SCS in the frequency band is at least 120 kHz (e.g., 120 kHz, 960 kHz, etc.).

The UE 115 may transmit the single PRACH format signal 810 in a frequency band, where the single PRACH format signal 810 includes a length in time that is based on a SCS in the frequency band. The single PRACH format signal 810 is longer than the short PRACH format signal 801 and includes multiple repetitions of the short PRACH format signal 801 during the length in time. Although the single PRACH format signal 810 is shown as including four repetitions of the single PRACH format signal 810, this is not intended to be limiting, and fewer than or more than four repetitions may be included in other examples of a single PRACH format signal that the UE 115 transmits to the BS 105. The number of repetitions may vary depending on the PRACH format, the symbol duration, and/or signal coverage requirement.

In some aspects, the single PRACH format signal 810 may include an aggregation of the multiple repetitions of the short PRACH format signal 801 with scaled numerology. For example, the UE 115 may aggregate the multiple repetitions of the short PRACH format signal 801 into the single PRACH format signal 810 and may repeat each of the short PRACH format signals in time to compensate for the loss in the coverage.

In some aspects, the single PRACH format signal 810 may include multiple repetitions of the short PRACH format signal 801 with scaled numerology based on a spreading code. The UE 115 may spread the multiple repetitions of the short PRACH format signal 801 over time by repeating the short PRACH format signal 801 in time and applying the spreading code to the multiple repetitions. For example, the spreading code may be [1, 1, 1, 1], and the UE 115 may apply the spreading code to the short PRACH format signal $801_{(1)}$, the short PRACH format signal $801_{(2)}$, the short PRACH format signal $801_{(3)}$, and the short PRACH format signal $801_{(4)}$, respectively. In this example, the UE 115 may multiply the short PRACH format signal $801_{(1)}$ by 1, multiply the short PRACH format signal $801_{(2)}$ by 1, multiply the short PRACH format signal $801_{(3)}$ by 1, and multiply the short PRACH format signal $801_{(4)}$ by 1. In another example, the spreading code may be [1, −1, 1, −1], and the UE 115 may apply the spreading code to the short PRACH format signal $801_{(1)}$, the short PRACH format signal $801_{(2)}$, the short PRACH format signal $801_{(3)}$, and the short PRACH format signal $801_{(4)}$, respectively. In this example, the UE 115 may multiply the short PRACH format signal $801_{(1)}$ by 1, multiply the short PRACH format signal $801_{(2)}$ by (−1), multiply the short PRACH format signal $801_{(3)}$ by 1, and multiply the short PRACH format signal $801_{(4)}$ by (−1).

The spreading with the spreading code may allow two UEs to transmit the same signal PRACH format signal 810 (e.g., four repetitions of the short PRACH format signal 801) using the same resource, but applying a different spreading code (e.g., orthogonal to each other). Accordingly, the BS 105 may differentiate the two single PRACH format signals transmitted by the two different UEs.

It should be understood that the UE 115 may apply aggregation and/or spreading to the multiple repetitions of the short PRACH format signal 801 (e.g., PRACH format A signal, PRACH format B signal, or PRACH format C signal). For example, the UE 115 may further apply spreading on top of the aggregation of multiple repetitions of the short PRACH format signal 801.

In some other aspects, the BS 105 may configure a PRACH format signal with a larger SCS to compensate for the PRACH coverage, where the PRACH format signal spans more than one slot. In some examples, the larger SCS is a SCS in the frequency band of at least 120 kHz (e.g., 120 kHz, 960 kHz, etc.). If the PRACH format signal (e.g., single PRACH format signal 810) occupies multiple contiguous slots, the PRACH format signal may block DL transmissions during the entire duration of the PRACH format signal, potentially reducing spectral utilization efficiency. To overcome this problem, for PRACH format signals exceeding one slot, the BS 105 may configure a PRACH format signal including a long PRACH sequence, where the long PRACH sequence includes a gap (e.g., one or more symbols). The gap may allow DL transmissions and/or other transmissions to be transmitted and/or received.

Figure 9:
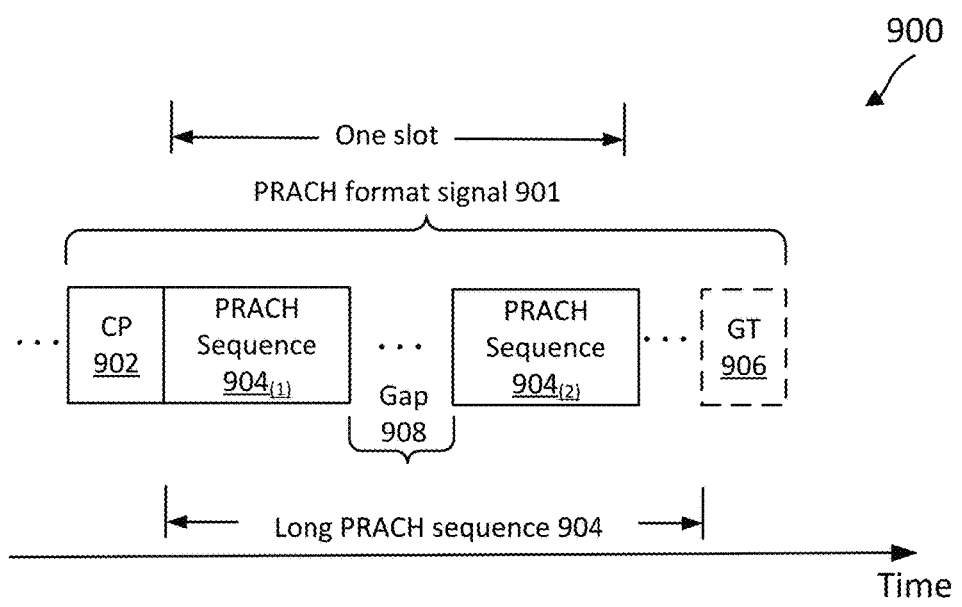
FIG. 9 illustrates a random access signal configuration including a gap according to one or more aspects of the present disclosure.

FIG. 9 illustrates a random access signal configuration 900 including a gap according to one or more aspects of the present disclosure. The configuration 900 may be employed by a BS such as the BS 105 and a UE such as the UE 115 in a network such as the network 100. In particular, a BS 105 may employ the configuration 900 to configure a PRACH format signal to facilitate network access. In FIG. 9, the x-axis represents time in some constant units.

In the example illustrated in FIG. 9, a PRACH format signal 901 includes a CP 902 followed by a long PRACH sequence 904, with or without a GT 906. The long PRACH sequence 904 may be a ZC sequence with a long sequence length. The sequence length may vary depending on the SCS, the symbol duration, and/or the target PRACH coverage. An example of a long sequence length may include a sequence with SCS 960 kHz, with Format B4 (see FIG. 3) modified to have forty-eight sequences instead of twelve. Another example of a long sequence length may include a sequence with format A3 (see FIG. 3) modified to have twenty-four sequences instead of six. As discussed further in the present disclosure, gaps may be inserted between the sequences to allow for DL transmissions by the BS 105. The long PRACH sequence 904 spans more than one slot and includes a gap 908. In an example, the BS 105 may receive the PRACH format signal 901 from a first UE and transmit a DL communication signal during the gap 908 to a second UE different from the first UE. In another example, the BS 105 may receive the PRACH format signal 901 from a first UE and receive an UL communication signal during the gap 908 from a second UE different from the first UE.

Although FIGS. 8 and 9 discussed transmission of PRACH format signals in relation to larger SCS (e.g., 120 kHz SCS, 960 kHz SCS, etc.), it should be understood that this not intended to be limiting and in other examples, the UE 115 transmits PRACH format signals using lower SCS (e.g., not greater than 120 kHz). In some examples, the higher band operation may also support lower SCS for both PRACH and data. With a lower SCS (e.g., SCS is not greater than 120 kHz), the PRACH coverage may be better compared to a higher SCS (e.g., SCS is at least 120 kHz). The timing resolution, however, may be limited due to the limited PRACH transmission bandwidth with the smaller SCS.

In the higher band (e.g., 60 GHz), a specification may specify a PSD limit (e.g., PSD limit of about 23 dBm/MHz) with up to a threshold equivalent isotropic radiated power (EIRP) (e.g., about 40 dBm EIRP). While a mobile terminal may operate at about 23 dBm, other user terminals (e.g., customer premises equipment (CPE)) may operate at a higher EIRP (e.g., up to 40 dBm). With 120 kHz SCS for PRACH and a short PRACH sequence having a length of 139, a total occupied PRACH bandwidth may be about 17 MHz. To fully utilize the UE 115's transmit power, a transmission bandwidth of about 50 MHz may be beneficial to comply with the shorter sequence length of 139. For example, for the UE to fully utilize its transmit power and have reasonable PRACH coverage, it may be desirable to use another PRACH design for the PRACH for the higher band other than the ones shown in FIGS. 8 and 9.

Figure 10:
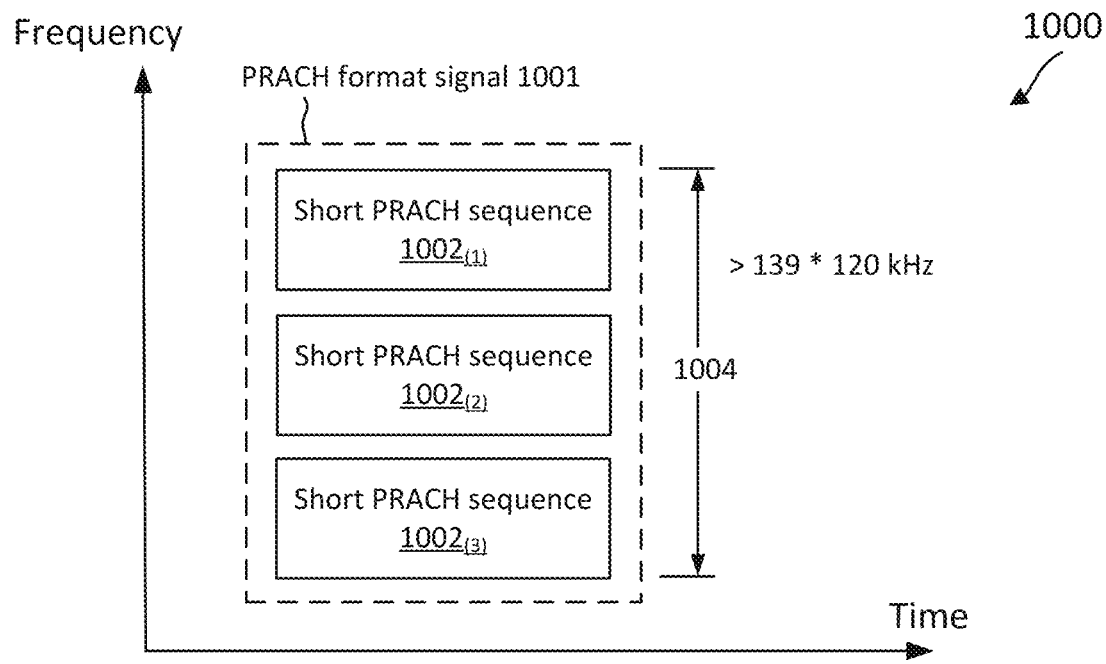
FIG. 10 illustrates a random access signal configuration including multiple repetitions of a PRACH sequence in frequency according to one or more aspects of the present disclosure.
Figure 11:
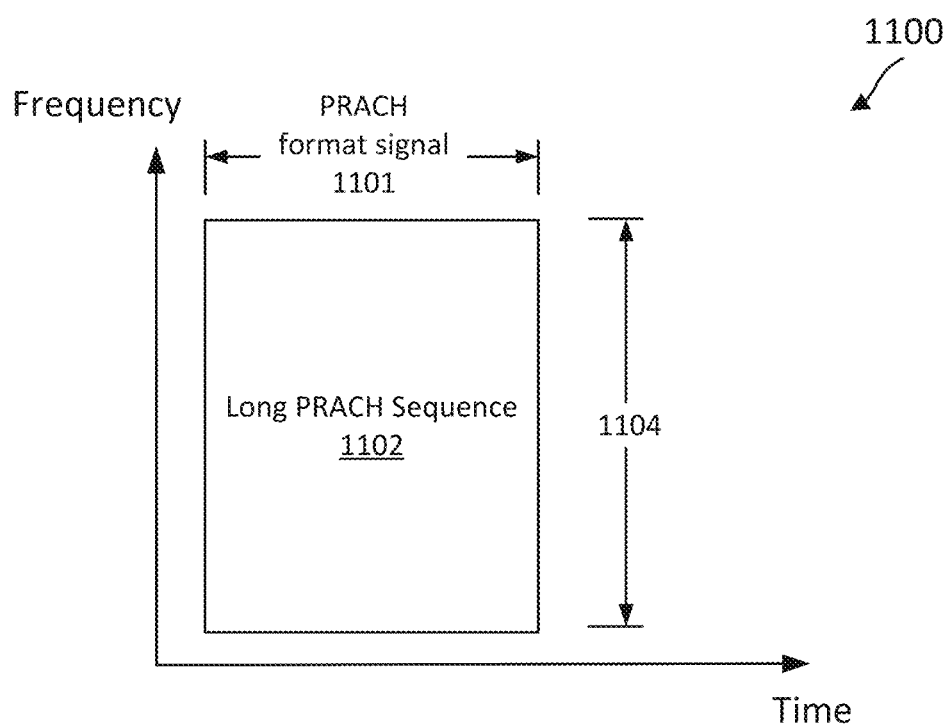
FIG. 11 illustrates a random access signal configuration including a long PRACH sequence spanning a wide bandwidth according to one or more aspects of the present disclosure.

When smaller SCS is used for transmission of PRACH preamble, wideband PRACH transmissions may be beneficial for both timing resolution as well as the power utilization with PSD limitation. In some examples, the UE 115 may transmit a single PRACH format signal including multiple repetitions of a short PRACH format signal in frequency, with the single PRACH format signal spanning a wide bandwidth, as shown in FIG. 10. The UE 115 may repeat the short PRACH format signals in the frequency domain to transmit at a full transmit power. In some examples, the UE 115 may transmit a long PRACH sequence spanning a wide bandwidth, as shown in FIG. 11.

FIG. 10 illustrates a random access signal configuration 1000 including multiple repetitions of a PRACH sequence in frequency according to one or more aspects of the present disclosure. The configuration 1000 may be employed by a BS such as the BS 105 and a UE such as the UE 115 in a network such as the network 100. In particular, a BS 105 may employ the configuration 1000 to configure a PRACH format signal to facilitate network access. In FIG. 10, the x-axis represents time in some constant units, and the y-axis represents frequency in some constant units.

A UE 115 may transmit a PRACH format signal 1001 in a frequency band 1004, the PRACH format signal 1001 including a length in frequency that is based on a SCS in the frequency band. The PRACH format signal 1001 may include multiple repetitions of a short PRACH sequence 1002 in the frequency domain 1004 spanning a wide bandwidth (e.g., length in frequency). The PRACH format signal 1001 may correspond to the PRACH preamble signal in FIG. 2 and/or to the PRACH formats shown in the table 310 of FIG. 3 and/or table 510 in FIG. 5. In some examples, the SCS it not greater than 120 kHz. The SCS may be, for example, 30 kHz, 60 kHz, 120 kHz, etc.

A power spectral density (PSD) may refer to the measure of a signal's power content versus frequency. For example, the PSD may refer to the frequency response of a signal transmitted by the UE 115 and may indicate where the average power is distributed as a function of frequency. Constant PSD may refer to the power of a signal being constant. A constant PSD restriction may avoid inter-mod/out-of-band emissions, effectively reducing the amount of adjacent band interference. Additionally, an equivalent Isotropic radiated power (EIRP) may refer to the product of transmitter power and the antenna gain in a given direction relative to an isotropic antenna of a radio transmitter. In higher band (e.g., 60 GHz), there is a PSD limit of 23 dBm/MHz with up to 40 dBm EIRP. In an example, to allow full power transmission with the PSD limitation, the UE 115 may transmit the PRACH format signal 1001, where the SCS is 120 kHz and the PRACH format signal 1001 includes three repetitions of the short PRACH sequence 1002 occupying a wide bandwidth of 50 MHz. In another example, to allow full power transmission with the PSD limitation, the UE 115 may transmit the PRACH format signal 1001, where the SCS is 60 kHz and the PRACH format signal 1001 includes six repetitions of the short PRACH sequence 1002 occupying a wide bandwidth of 50 MHz.

Additionally, power-to-average peak ratio (PAPR) may refer to the relation between the maximum power of a sample in a given OFDM transmit symbol divided by the average power of that ODFM symbol. In other words, PAPR may refer to the ratio of peak power to the average power of a signal. To avoid higher PAPR due to the frequency domain repetition, each repetition of the multiple repetitions may use a different cyclic shift and/or a different root sequence. In some examples, each repetition of the multiple repetitions included in the PRACH format signal 1001 may include a different cyclic shift. For example, a first repetition (e.g., short PRACH sequence $1002_{(1)}$) of the multiple repetitions included in the PRACH format signal 1001 may include a first cyclic shift and a second repetition (e.g., short PRACH sequence $1002_{(2)}$) of the multiple repetitions included in the PRACH format signal 1001 may include a second cyclic shift different from the first cyclic shift, and so on.

In some examples, each repetition of the multiple repetitions included in the PRACH format signal 1001 may include a different root sequence. For example, a first repetition (e.g., short PRACH sequence $1002_{(2)}$) of the multiple repetitions included in the PRACH format signal 1001 may include a first root sequence and a second repetition (e.g., short PRACH sequence $1002_{(3)}$) of the multiple repetitions included in the PRACH format signal 1001 may include a second root sequence different from the first root sequence, and so on. As discussed in relation to FIG. 5, the table 510 provides a logical mapping to an actual root index to be used for the ZC sequence generated. To generate a ZC sequence, the UE 115 may substitute a root index and a cyclic shift into a ZC sequence equation. The BS 105 may configure the UE 115 with the logical root index, and the UE 115 may look up the logical root index using the column 502 in the table 510. In some examples, the BS 105 may configure the UE 115 with different logical root index mapping tables for different sequence lengths as shown in FIG. 5. In general, the BS 105 may configure the UE 115 with PRACH sequence generation parameters in any suitable formats.

In some examples, the short PRACH sequence 1002 may have a sequence length of 139 and the length in frequency (e.g., bandwidth) spans or includes 50 MHz. In an example, the SCS is 120 kHz, the PRACH format signal 1001 includes three repetitions of the short PRACH sequence 1002, and the length in frequency includes 50 MHz. In another example, the SCS is 60 kHz, the PRACH format signal 1001 includes six repetitions of the short PRACH sequence, and the length in frequency includes 50 MHz.

The BS 105 may configure a number of frequency repetitions in the multiple repetitions of the short PRACH sequence 1002, a number of cyclic shifts in the multiple repetitions of the short PRACH sequence 1002, and/or a number of root sequence mappings in the multiple repetitions of the short PRACH sequence 1002.

FIG. 11 illustrates a random access signal configuration 1100 including a long PRACH sequence spanning a wide bandwidth according to one or more aspects of the present disclosure. The configuration 1100 may be employed by a BS such as the BS 115 and a UE such as the UE 115 in a network such as the network 110. In particular, a BS 115 may employ the configuration 1100 to configure a PRACH format signal to facilitate network access. In FIG. 11, the x-axis represents time in some constant units, and the y-axis represents frequency in some constant units.

A UE 115 may transmit a PRACH format signal 1101 in a frequency band 1104, the PRACH format signal 1101 including a length in frequency that is based on a SCS in the frequency band. The PRACH format signal 1101 may include a long PRACH sequence 1102 in the frequency domain 1104 spanning a wide bandwidth (e.g., length in frequency). In some examples, the SCS is not greater than 120 kHz. The SCS may be, for example, 30 kHz, 60 kHz, 120 kHz, etc. In some examples, the SCS may be 120 kHz, the long PRACH sequence 1102 may have a length in frequency of about 50 MHz (e.g., may occupy about a 50 MHz bandwidth) and a sequence length of about 409. In some examples, the long PRACH sequence 1102 may include a PRACH preamble with a long sequence length (e.g., 571, 839, or 1151, or another sequence length), and the UE 115 may reuse the corresponding PRACH logical index parameter as well as the zero correlation zone configurations.

For FR1, a longer sequence with a length of 839 may be allowed with 1.25 kHz SCS and/or 5 kHz SCS. In addition, longer sequences with lengths of 571 may be allowed with 30 kHz SCS, while a sequence with a length of 1151 may allowed with 15 kHz SCS. The PRACH logical index parameter as well as the zero correlation zone configurations are included in FIG. 5. In some examples, a 120 kHz SCS with a length of 839, 571, and/or 1151 for mmWave may be used. The UE may reuse the design of these longer sequences as in FIG. 5 after scaling the numerology to 120 kHz for high band operation.

Figure 12:
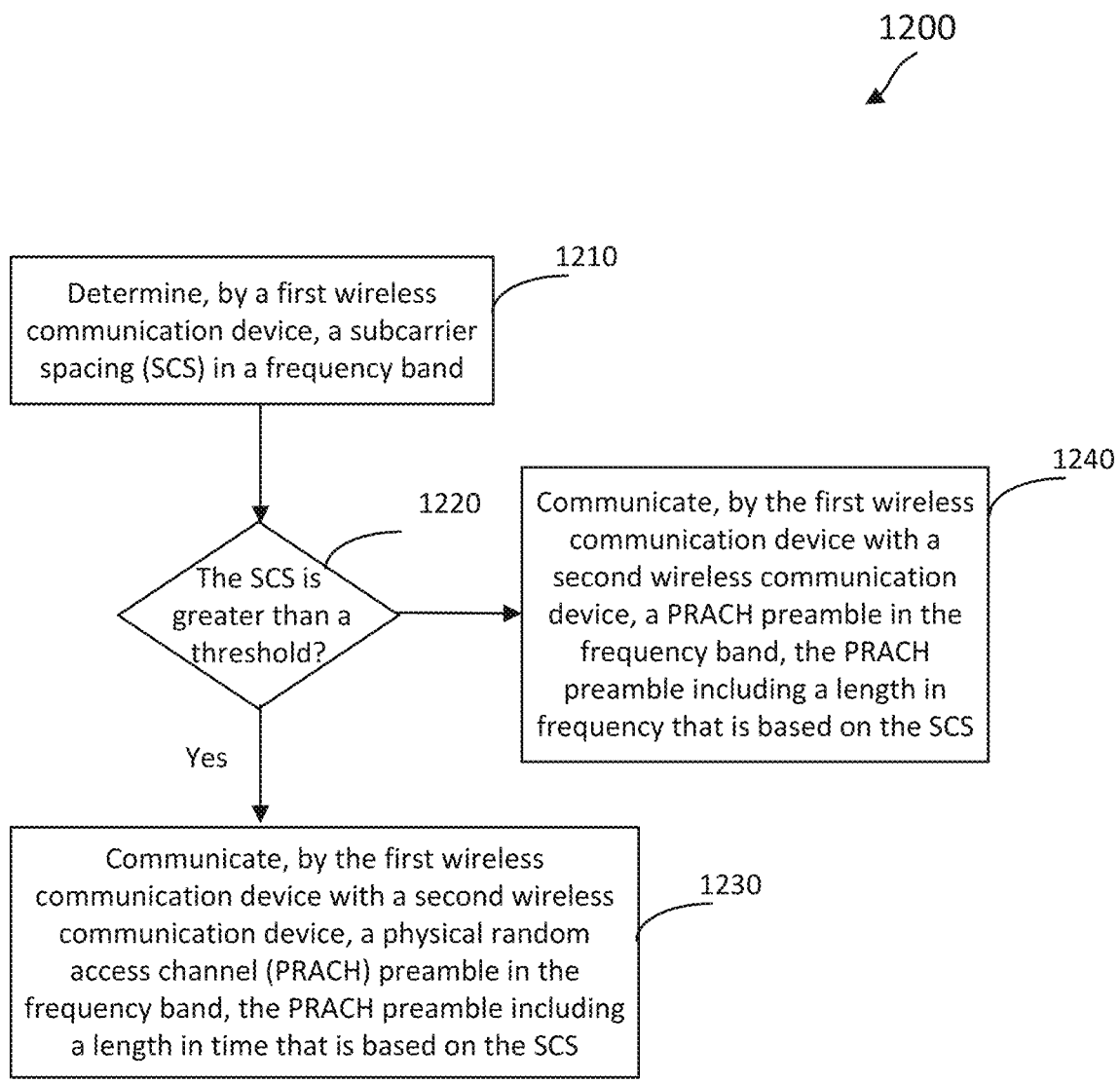
FIG. 12 is a flow diagram of a wireless communication method according to one or more aspects of the present disclosure.

FIG. 12 is a flow diagram of a wireless communication method 1200 according to one or more aspects of the present disclosure. Aspects of the method 1200 can be executed by a computing device (e.g., a processor, processing circuit, and/or other suitable component) of a wireless communication device or other suitable means for executing the blocks. In some examples, a wireless communication device, such as the UEs 115 and/or 600, may utilize one or more components, such as the processor 602, the memory 604, the RACH module 608, the transceiver 610, the modem 612, and the one or more antennas 616, to execute the blocks of method 1200. In some examples, a wireless communication device, such as the BSs 105 and/or 700, may utilize one or more components, such as the processor 702, the memory 704, the RACH module 708, the transceiver 710, the modem 712, and the one or more antennas 716, to execute the blocks of method 1200. The method 1200 may employ similar mechanisms as discussed in relation to FIGS. 1, 2, 3, 4, 5, 6, 7, 8, 9, 10, and/or 11. As illustrated, the method 1200 includes a number of enumerated blocks, but aspects of the method 1200 may include additional blocks before, after, and in between the enumerated blocks. In some aspects, one or more of the enumerated blocks may be omitted or performed in a different order.

At block 1210, a first wireless communication device (e.g., the UE 115, the UE 600, the BS 105, and/or the BS 700) determines a SCS in a frequency band.

At block 1220, the first wireless communication device (e.g., the UE 115, the UE 600, the BS 105, and/or the BS 700) determines whether the SCS is greater than a threshold. The threshold may be, for example, 120 kHz. In an example, if the SCS is greater than the threshold (e.g., 120 kHz), process flow may proceed to block 1230. If the SCS is not greater than the threshold, process flow may proceed to block 1240.

At block 1230, the first wireless communication device (e.g., the UE 115, the UE 600, the BS 105, and/or the BS 700) communicates with a second wireless communication device, a PRACH preamble in the frequency band, the PRACH preamble including a length in time that is based on the SCS. The PRACH preamble including a length in time may correspond to, for example, configuration 800 in FIG. 9 and/or configuration 900 in FIG. 9.

At block 1240, the first wireless communication device (e.g., the UE 115, the UE 600, the BS 105, and/or the BS 700) communicates with a second wireless communication device, a PRACH preamble in the frequency band, the PRACH preamble including a length in frequency that is based on the SCS. The PRACH preamble including a length in frequency may correspond to, for example, configuration 1000 in FIG. 10 and/or configuration 1100 in FIG. 11.

In some instances, the first wireless communication device is a UE that utilizes one or more components, such as the processor 602, the RACH module 608, the transceiver 610, the modem 612, and the one or more antennas 616, to determine the SCS in the frequency band, determine whether the SCS is greater than a threshold, and/or transmits the PRACH preamble in the frequency band, the PRACH preamble including either a length in time that is based on the SCS or a length in frequency that is based on the SCS.

In some instances, the first wireless communication device is a BS that utilizes one or more components, such as the processor 702, the RACH module 708, the transceiver 710, the modem 712, and the one or more antennas 716, to determine the SCS in the frequency band, determine whether the SCS is greater than a threshold, and/or receive the PRACH preamble in the frequency band, the PRACH preamble including either a length in time that is based on the SCS or a length in frequency that is based on the SCS.

Figure 13:
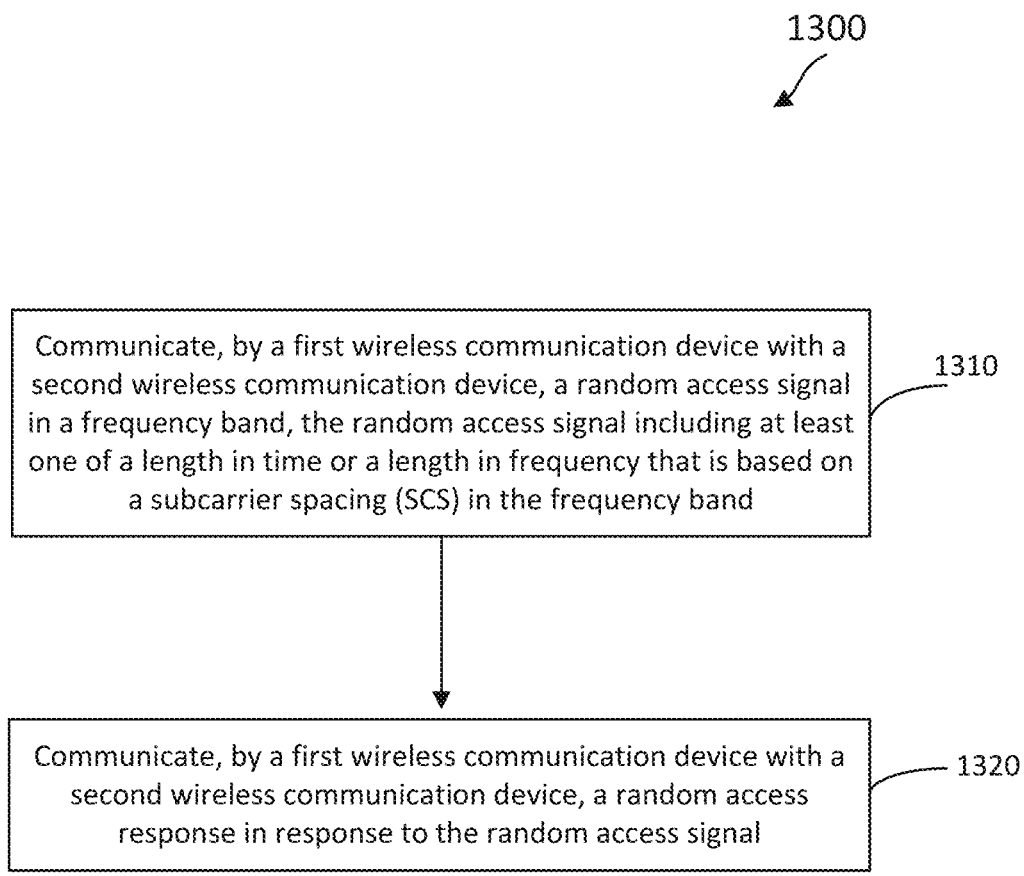
FIG. 13 is a flow diagram of a wireless communication method according to one or more aspects of the present disclosure.

FIG. 13 is a flow diagram of a wireless communication method 1300 according to one or more aspects of the present disclosure. Aspects of the method 1300 can be executed by a computing device (e.g., a processor, processing circuit, and/or other suitable component) of a wireless communication device or other suitable means for executing the blocks. In some examples, a wireless communication device, such as the UEs 115 and/or 600, may utilize one or more components, such as the processor 602, the memory 604, the RACH module 608, the transceiver 610, the modem 612, and the one or more antennas 616, to execute the blocks of method 1300. In some examples, a wireless communication device, such as the BSs 105 and/or 700, may utilize one or more components, such as the processor 702, the memory 704, the RACH module 708, the transceiver 710, the modem 712, and the one or more antennas 716, to execute the blocks of method 1300. The method 1300 may employ similar mechanisms as discussed in relation to FIGS. 1, 2, 3, 4, 5, 6, 7, 8, 9, 10, and/or 11. As illustrated, the method 1300 includes a number of enumerated blocks, but aspects of the method 1300 may include additional blocks before, after, and in between the enumerated blocks. In some aspects, one or more of the enumerated blocks may be omitted or performed in a different order.

At block 1310, a first wireless communication device (e.g., the UE 115, the UE 600, the BS 105, and/or the BS 700) communicates with a second wireless communication device, a random access signal in a frequency band, the random access signal including at least one of a length in time or a length in frequency that is based on a SCS in the frequency band. The random access signal may be a PRACH preamble. In some instances, the first wireless communication device is a UE that utilizes one or more components, such as the processor 602, the RACH module 608, the transceiver 610, the modem 612, and the one or more antennas 616, to communicate with a BS, a random access signal in a frequency band, the random access signal including at least one of a length in time or a length in frequency that is based on a SCS in the frequency band.

In some instances, the first wireless communication device is a BS that utilizes one or more components, such as the processor 702, the RACH module 708, the transceiver 710, the modem 712, and the one or more antennas 716, to communicate with a UE, a random access signal in a frequency band, the random access signal including at least one of a length in time or a length in frequency that is based on a SCS in the frequency band. The UE may transmit the random access signal in the frequency band, and the BS may receive the random access signal from the UE.

It should be understood that a single long sequence, a single instance, and/or no repetition may be used for the time length and/or for the frequency length.

In some examples, the SCS is at least 120 kHz. In some examples, the UE may transmit the random access signal including multiple repetitions of a short PRACH format signal during the length in time. The BS may receive the random access signal. The UE may transmit the multiple repetitions by communicating an aggregation of the multiple repetitions of the short PRACH format signal with a scaled numerology. The BS may receive the random access signal. The short PRACH format signal may include a PRACH format A signal, a PRACH format B signal, and/or a PRACH format C signal. If the short PRACH format signal is a PRACH format A signal, each repetition of the multiple repetitions may include a CP and a PRACH sequence. If the short PRACH format signal is a PRACH format B signal or a PRACH format C signal, each repetition of the multiple repetitions may include a CP, a PRACH sequence, and a GT.

In some examples, the UE may transmit the random access signal including multiple repetitions of the short PRACH format signal with a scaled numerology and based on a spreading code. The BS may receive the random access signal. In some examples, the UE may transmit the random access signal including a long PRACH sequence spanning more than one slot, the long PRACH sequence including the gap. The BS may receive the random access signal.

In some examples, the UE transmits the random access signal in the frequency band by communicating the random access signal in a mmWv frequency band.

In some examples, the SCS is not greater than 120 kHz. In some examples, the UE may transmit the random access signal including multiple repetitions of a short PRACH sequence in a frequency domain spanning the length in frequency. In an example, the SCS is 120 kHz, the multiple repetitions includes three repetitions of the short PRACH sequence, and the length in frequency includes 50 MHz. In another example, the SCS is 60 kHz, the multiple repetitions includes six repetitions of the short PRACH sequence, and the length in frequency includes 50 MHz.

In some examples, the UE transmits a first cyclic shift in a first repetition of the multiple repetitions and transmits a second cyclic shift in a second repetition of the multiple repetitions, the first cyclic shift being different from the second cyclic shift. The BS may receive the first cyclic shift in the first repetition and receive the second cyclic shift in the second repetition. In some examples, the UE transmits a first root sequence in a first repetition of the multiple repetitions and a second root sequence in a second repetition of the multiple repetitions, the first root sequence being different from the second root sequence. The BS may receive the first root sequence in the first repetition and receive the second root sequence in the second repetition.

In some examples, the first wireless communication device is a BS that configures a number of frequency repetitions in the multiple repetitions for communicating the random access signal, a number of cyclic shifts in the multiple repetitions for communicating the random access signal, and/or configuring a number of root sequence mapping in the multiple repetitions for communicating the random access signal.

In some examples, the UE transmits the random access signal including a long PRACH sequence in a frequency domain spanning the length in frequency. The BS may receive the random access signal. In an example, the SCS is 120 kHz, and the long PRACH sequence has a length in frequency of 50 MHz. In some examples, the UE uses a corresponding PRACH logical index parameter as well as one or more zero correlation zone configurations to determine a long PRACH sequence. The long PRACH sequence may be, for example, a length of 571, 839, or 1151.

At block 1320, the first wireless communication device (e.g., the UE 115, the UE 600, the BS 105, and/or the BS 700) communicates with a second wireless communication device, a random access response in response to the random access signal. In some instances, the first wireless communication device is a UE that utilizes one or more components, such as the processor 602, the RACH module 608, the transceiver 610, the modem 612, and the one or more antennas 616, to communicate with a BS, a random access response in response to the random access signal. In some instances, the first wireless communication device is a BS that utilizes one or more components, such as the processor 702, the RACH module 708, the transceiver 710, the modem 712, and the one or more antennas 716, to communicate with a UE, a random access response in response to the random access signal.

In some aspects of the disclosure, a method of wireless communication includes: communicating, by a first wireless communication device with a second wireless communication device, a random access signal in a frequency band, the random access signal including at least one of a length in time or a length in frequency that is based on a subcarrier spacing (SCS) in the frequency band; and communicating, by a first wireless communication device with a second wireless communication device, a random access response in response to the random access signal.

In some examples, the SCS is at least 120 kilohertz (kHz). In some cases, communicating a random access signal includes communicating multiple repetitions of a short physical random access channel (PRACH) format signal during the length in time. In some cases, communicating multiple repetitions includes communicating an aggregation of the multiple repetitions of the short PRACH format signal with a scaled numerology. In some examples, the short PRACH format signal includes a PRACH format A signal. In some examples, the short PRACH format signal includes a PRACH format B signal. In some examples, the short PRACH format signal includes a PRACH format C signal. In some examples, each repetition of the multiple repetitions includes a cyclic prefix (CP), a PRACH sequence, and a guard time (GT). In some examples, each repetition of the multiple repetitions includes a CP and a PRACH sequence. In some examples, communicating multiple repetitions includes communicating the multiple repetitions of the short PRACH format signal with a scaled numerology and based on a spreading code. In some examples, communicating a random access signal includes communicating a long PRACH sequence spanning more than one slot, and the long PRACH sequence includes the gap.

In some examples, the method of wireless communication further includes communicating, by the first wireless communication device with a third wireless communication device during the gap, a downlink (DL) communication signal. In some cases, the SCS is not greater than 120 kHz. In some cases, communicating a random access signal includes communicating multiple repetitions of a short PRACH sequence in a frequency domain spanning the length in frequency. In some examples, the SCS is 120 kHz, and communicating multiple repetitions includes communicating three repetitions of the short PRACH sequence, where the length in frequency includes 50 MHz.

In some examples, the SCS is 60 kHz, and communicating multiple repetitions includes communicating six repetitions of the short PRACH sequence, where the length in frequency includes 50 MHz. In some examples, communicating multiple repetitions includes communicating a first cyclic shift in a first repetition of the multiple repetitions and communicating a second cyclic shift in a second repetition of the multiple repetitions, where the first cyclic shift is different from the second cyclic shift. In some examples, communicating multiple repetitions includes communicating a first root sequence in a first repetition of the multiple repetitions and communicating a second root sequence in a second repetition of the multiple repetitions, where the first root sequence is different from the second root sequence.

In some cases, the first wireless communication device is a base station (BS), where the method further includes configuring, by the BS, a number of frequency repetitions in the multiple repetitions for communicating the random access signal. In some cases, the first wireless communication device is BS, where the method further includes configuring, by the BS, a number of cyclic shifts in the multiple repetitions for communicating the random access signal. In some cases, the first wireless communication device is BS, where the method further includes configuring, by the BS, a number of root sequence mapping in the multiple repetitions for communicating the random access signal. In some examples, communicating a random access signal includes communicating a long PRACH sequence in a frequency domain spanning the length in frequency. In some cases, the SCS is 120 kHz, and the long PRACH sequence has a length in frequency of 50 MHz. In some cases, communicating a random access signal includes using a corresponding PRACH logical index parameter as well as one or more zero correlation zone configurations to determine the long PRACH sequence. In some examples, the long PRACH sequence has a length of 571, 839, or 1151. In some cases, communicating a random access signal includes communicating a physical random access channel (PRACH) preamble. In some cases, communicating a random access signal in a frequency band includes communicating the random access signal in a millimeter Wave (mmWv) frequency band.

In some aspects of the disclosure, an apparatus includes a transceiver configured to: communicate, by a first wireless communication device with a second wireless communication device, a random access signal in a frequency band, wherein the random access signal includes at least one of a length in time or a length in frequency that is based on a subcarrier spacing (SCS) in the frequency band; and communicate, by a first wireless communication device with a second wireless communication device, a random access response in response to the random access signal.

In some examples, the SCS is at least 120 kilohertz (kHz). In some cases, the random access signal includes multiple repetitions of a short physical random access channel (PRACH) format signal during the length in time. In some examples, the multiple repetitions includes an aggregation of the multiple repetitions of the short PRACH format signal with a scaled numerology. In some cases, the short PRACH format signal includes at least one of a PRACH format A signal, a PRACH format B signal, or a PRACH format C signal. In some examples, each repetition of the multiple repetitions includes a cyclic prefix (CP) and a PRACH sequence.

In some cases, the multiple repetitions include multiple repetitions of the short PRACH format signal with a scaled numerology and based on a spreading code. In some cases, the random access signal includes a long PRACH sequence spanning more than one slot, and the long PRACH sequence includes the gap, where the transceiver is further configured to communicate, by the first wireless communication device with a third wireless communication device during the gap, a downlink (DL) communication signal. In some examples, the SCS is not greater than 120 kHz. In some cases, the random access signal includes multiple repetitions of a short PRACH sequence in a frequency domain spanning the length in frequency. In some examples, the multiple repetitions includes a first cyclic shift in a first repetition of the multiple repetitions and a second cyclic shift in a second repetition of the multiple repetitions, where the first cyclic shift is different from the second cyclic shift. In some examples, the multiple repetitions includes a first root sequence in a first repetition of the multiple repetitions and a second root sequence in a second repetition of the multiple repetitions, where the first root sequence is different from the second root sequence.

In some examples, the first wireless communication device is a base station (BS), where the apparatus further includes a processor configured to configure, by the BS, a number of frequency repetitions in the multiple repetitions. In some examples, the first wireless communication device is a BS, where the apparatus further includes a processor configured to configure, by the BS, a number of cyclic shifts in the multiple repetitions. In some examples, the first wireless communication device is a BS, where the apparatus further includes a processor configured to configure, by the BS, a number of root sequence mapping in the multiple repetitions. In some examples, the random access signal includes a long PRACH sequence in the frequency domain. In some cases, the transceiver is further configured to communicate a random access signal using a corresponding PRACH logical index parameter as well as one or more zero correlation zone configurations to determine the long PRACH sequence. In some cases, the long PRACH sequence has a length of 571, 839, or 1151.

In some aspects of the disclosure, a computer-readable medium having program code recorded thereon, the program code includes: code for causing a first wireless communication device to communicate with a second wireless communication device, a random access signal in a frequency band, wherein the random access signal includes at least one of a length in time or a length in frequency that is based on a subcarrier spacing (SCS) in the frequency band; and code for causing the first wireless communication device to communicate with a second wireless communication device, a random access response in response to the random access signal. In some examples, the SCS is at least 120 kilohertz (kHz), and the code for causing the first wireless communication device to communicate the random access signal includes code for causing the first wireless communication device to communicate multiple repetitions of a short physical random access channel (PRACH) format signal during the length in time. In some cases, the SCS is not greater than 120 kHz, and the code for causing the first wireless communication device to communicate the random access signal includes code for causing the first wireless communication device to communicate multiple repetitions of a short PRACH sequence in a frequency domain spanning the length in frequency.

In some aspects of the disclosure, an apparatus includes: means for communicating with a second wireless communication device, a random access signal in a frequency band, the random access signal including at least one of a length in time or a length in frequency that is based on a subcarrier spacing (SCS) in the frequency band; and means for communicating with a second wireless communication device, a random access response in response to the random access signal. In some examples, the means for communicating the random access signal include means for communicating multiple repetitions of a short physical random access channel (PRACH) format signal during the length in time, and wherein the SCS is at least 120 kilohertz (kHz). In some examples, the means for communicating the random access signal include means for communicating multiple repetitions of a short PRACH sequence in a frequency domain spanning the length in frequency, and wherein the SCS is not greater than 120 kHz.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first wireless communication device, the method comprising:
communicating, with a second wireless communication device, a random access signal in a frequency band, the random access signal including at least one of a length in time or a length in frequency, and the communicating the random access signal comprising communicating, based on a subcarrier spacing (SCS) in the frequency band exceeding a SCS threshold:
multiple repetitions of a short physical random access channel (PRACH) format signal; or
a long PRACH sequence spanning more than one slot; and
communicating, with the second wireless communication device, a random access response in response to the random access signal.

2. The method of claim 1, wherein the SCS threshold is at least 120 kilohertz (kHz).

3. The method of claim 2, wherein the communicating the random access signal includes communicating the multiple repetitions of the short PRACH format signal during the length in time.

4. The method of claim 3, wherein the communicating the multiple repetitions includes at least one of communicating an aggregation of the multiple repetitions of the short PRACH format signal with a scaled numerology or communicating the multiple repetitions of the short PRACH format signal with the scaled numerology and based on a spreading code.

5. The method of claim 4, wherein the short PRACH format signal includes at least one of a PRACH format A signal, a PRACH format B signal, or a PRACH format C signal.

6. The method of claim 2, wherein each repetition of the multiple repetitions includes a cyclic prefix (CP), a PRACH sequence, and a guard time (GT).

7. The method of claim 2, wherein each repetition of the multiple repetitions includes a CP and a PRACH sequence.

8. The method of claim 2, further comprising:
communicating, with a third wireless communication device during a gap, a downlink (DL) communication signal, wherein the communicating a random access signal includes communicating the long PRACH sequence spanning the more than one slot, and wherein the long PRACH sequence includes the gap.

9. The method of claim 1, wherein the communicating the random access signal includes communicating multiple repetitions of the short PRACH format signal in a frequency domain spanning the length in frequency.

10. The method of claim 9, wherein the SCS is 120 kHz, the communicating the multiple repetitions includes communicating three repetitions of the short PRACH sequence, and the length in frequency includes 50 megahertz (MHz).

11. The method of claim 9, wherein the SCS is 60 kHz, the communicating multiple repetitions includes communicating six repetitions of the short PRACH sequence, and the length in frequency includes 50 MHz.

12. The method of claim 9, wherein the communicating multiple repetitions includes communicating a first cyclic shift or a first root sequence in a first repetition of the multiple repetitions and communicating a second cyclic shift or a second root sequence in a second repetition of the multiple repetitions, the first cyclic shift being different from the second cyclic shift, and the first root sequence being different from the second root sequence.

13. The method of claim 9, wherein the first wireless communication device is a base station (BS), the method further comprising:
configuring, by the BS, at least one of a first number of frequency repetitions, a second number of cyclic shifts, or a third number of root sequence mappings in the multiple repetitions for communicating the random access signal.

14. The method of claim 1, wherein the communicating the random access signal includes communicating the long PRACH sequence in a frequency domain spanning the length in frequency.

15. The method of claim 14, wherein the SCS is 120 kHz, and the long PRACH sequence has a length in frequency of 50 MHz.

16. The method of claim 14, wherein the communicating a random access signal includes using a corresponding PRACH logical index parameter and one or more zero correlation zone configurations to determine the long PRACH sequence.

17. The method of claim 16, wherein the long PRACH sequence has a length of 571, 839, or 1151.

18. An apparatus, comprising:
a transceiver configured to:
communicate, with a second wireless communication device, a random access signal in a frequency band, wherein the random access signal includes at least one of a length in time or a length in frequency, and the transceiver configured to communicate the random access signal comprising the transceiver configured to communicate, based on a subcarrier spacing (SCS) in the frequency band exceeding a threshold:
multiple repetitions of a short physical random access channel (PRACH) format signal; or
a long PRACH sequence spanning more than one slot; and
communicate, with the second wireless communication device, a random access response in response to the random access signal.

19. The apparatus of claim 18, wherein the random access signal includes the multiple repetitions of the short PRACH format signal during the length in time.

20. The apparatus of claim 19, wherein the multiple repetitions includes at least one of an aggregation of the multiple repetitions of the short PRACH format signal with a scaled numerology or includes multiple repetitions of the short PRACH format signal with the scaled numerology and based on a spreading code.

21. The apparatus of claim 20, wherein the short PRACH format signal includes at least one of a PRACH format A signal, a PRACH format B signal, or a PRACH format C signal.

22. The apparatus of claim 18, wherein the random access signal includes the long PRACH sequence spanning the more than one slot, and the long PRACH sequence includes a gap, and wherein the transceiver is further configured to communicate, with a third wireless communication device during the gap, a downlink (DL) communication signal.

23. The apparatus of claim 18, wherein the random access signal includes the multiple repetitions of a short PRACH sequence in a frequency domain spanning the length in frequency.

24. The apparatus of claim 23, wherein the apparatus comprises a base station (BS), the apparatus further comprising:

a processor configured to:
configure, by the BS, at least one of a first number of frequency repetitions in the multiple repetitions, a second number of cyclic shifts in the multiple repetitions, or a third number of root sequence mappings in the multiple repetitions.

25. The apparatus of claim 23, wherein the random access signal includes the long PRACH sequence in the frequency domain.

26. The apparatus of claim 25, wherein the transceiver is configured to:
communicate a random access signal using a corresponding PRACH logical index parameter and one or more zero correlation zone configurations to determine the long PRACH sequence.

27. The apparatus of claim 26, wherein the long PRACH sequence has a length of 571, 839, or 1151.

28. A non-transitory, computer-readable medium having program code recorded thereon, the program code comprising:
code for causing a first wireless communication device to communicate with a second wireless communication device, a random access signal in a frequency band, wherein the random access signal includes at least one of a length in time or a length in frequency, wherein the code for causing the first wireless communication device to communicate the random access signal comprises code for causing the first wireless communication device to communicate, based on a subcarrier spacing (SCS) in the frequency band exceeding a SCS threshold:
multiple repetitions of a short physical random access channel (PRACH) format signal; or
a long PRACH sequence spanning more than one slot; and
code for causing the first wireless communication device to communicate with the second wireless communication device, a random access response in response to the random access signal.

29. The non-transitory, computer-readable medium of claim 28, wherein the code for causing the first wireless communication device to communicate a random access signal includes code for causing the first wireless communication device to communicate a long PRACH sequence in a frequency domain spanning the length in frequency, wherein the SCS is 120 kilohertz (kHz), and wherein the long PRACH sequence has a length in frequency of 50 megahertz (MHz).

30. The non-transitory, computer-readable medium of claim 28, wherein the code for causing the first wireless communication device to communicate a random access signal includes code for causing the first wireless communication device to communicate a long PRACH sequence in a frequency domain spanning the length in frequency and code for causing the first wireless communication device to use a corresponding PRACH logical index parameter and one or more zero correlation zone configurations to determine the long PRACH sequence.

* * * * *